No. 751,391. PATENTED FEB. 2, 1904.
L. D. GOUGHENOUR & J. A. MARX.
HOSE COUPLING AND SHUT OFF.
APPLICATION FILED JULY 18, 1903.
NO MODEL.

Witnesses:

Inventors
L. D. Goughenour
J. A. Marx,
By
Attorneys

No. 751,391. Patented February 2, 1904.

UNITED STATES PATENT OFFICE.

LEVI D. GOUGHENOUR AND JULIUS A. MARX, OF BRADDOCK, PENNSYLVANIA; SAID GOUGHENOUR ASSIGNOR TO SAID MARX.

HOSE COUPLING AND SHUT-OFF.

SPECIFICATION forming part of Letters Patent No. 751,391, dated February 2, 1904.

Application filed July 18, 1903. Serial No. 166,162. (No model.)

*To all whom it may concern:*

Be it known that we, LEVI D. GOUGHENOUR and JULIUS A. MARX, citizens of the United States of America, residing at Braddock, in the county of Allegheny and State of Pennsylvania, have invented certain new and useful Improvements in Hose Couplings and Shut-Offs, of which the following is a specification, reference being had therein to the accompanying drawings.

This invention relates to certain new and useful improvements in hose couplings and shut-offs; and the primary object of the present invention is to provide a quick-acting coupling particularly adapted for use in connection with water-line hose, though applicable alike to hose for steam, gas, or other fluid, and in which the action of coupling the members together automatically opens the inlet-port to allow the fluid to pass to the outlet and the uncoupling of which automatically closes the inlet-port to shut off the flow of the fluid.

Briefly described, our invention comprises a male and female member, the latter embodying a valve-casing in which is fitted the plug-valve provided with a transverse port extending therethrough. This plug-valve is held in the female member and is rotated therein, whereby to open or close the port by means of the tapering plug carried by the male member, the male member being adapted to interlock with the female member. Means is provided for holding the members in the coupled position to prevent the accidental disengagement thereof.

The invention consists in the novel construction, combination, and arrangement of parts to be hereinafter more fully described, and specifically pointed out in the claims, and in describing the invention in detail reference is had to the accompanying drawings, forming a part of this specification, and wherein like numerals of reference indicate like parts throughout the several views, in which—

Figure 1:
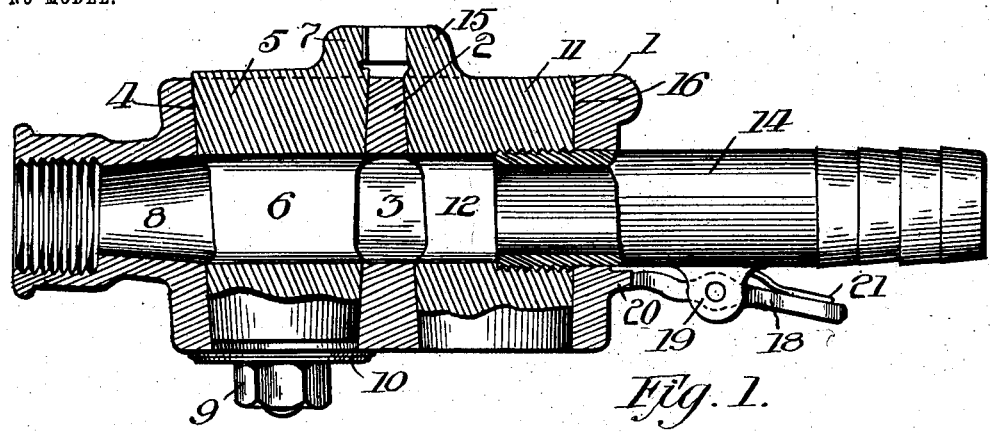
Figure 2:
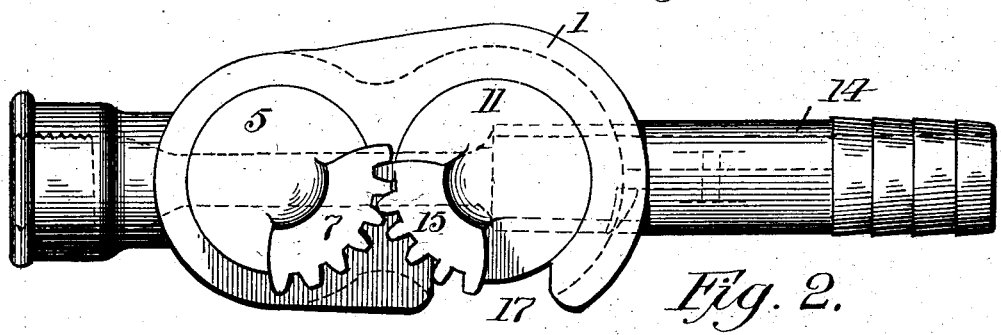
Figure 3:
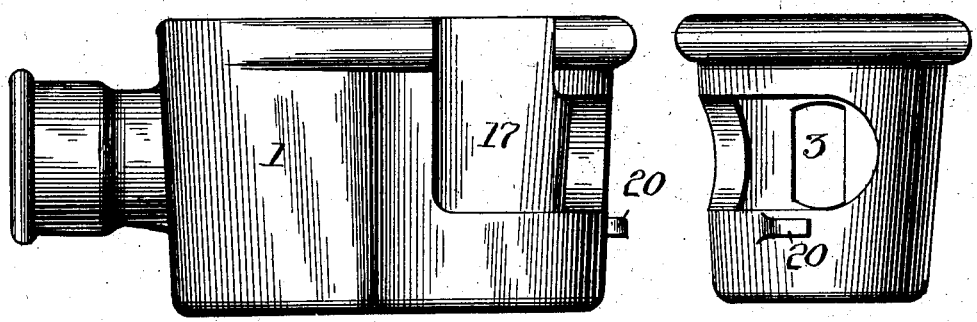
Figure 4:
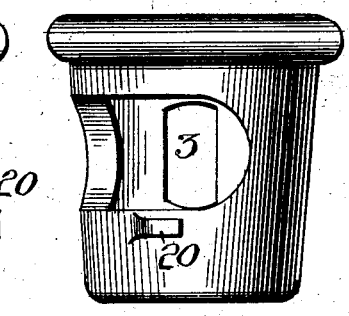

Figure 1 is a longitudinal sectional view of our improved coupling, partly in side elevation, showing the members in the coupled position. Fig. 2 is a top plan view of the members in the coupled position. Fig. 3 is a detached side elevation of the female member, and Fig. 4 is an end view of the same.

In the practice of our invention we provide a female member embodying a valve-casing 1, which is provided with a central dividing wall or partition 2, having a central port 3. This valve casing or member is provided with two tapering valve-seats to receive the tapering plug members or valves, the projection 2 supporting the two tapering seats, and the port 3 establishes communication between the two. In the valve-seat 4 is fitted for rotation the tapering plug-valve 5, which is provided with a transverse port 6, and on its upper end is a toothed segment 7, projecting to one side of the valve and slightly beyond the periphery thereof. The valve-casing 1 has a suitable inlet-port 8, with which connection is made to the joint, spigot, line of hose, or other connection. The plug-valve 5 is held within its valve-seat by means of the nut 9 and washer 10 or in any other approved manner that may be desired. The male member of the coupling comprises a tapering plug 11, which is provided with a transverse bore 12 and carries a pipe-section 14, the outer end of which is preferably corrugated or otherwise surfaced, whereby to receive the section of hose. (Not shown.) This tapering plug carries on its upper end the toothed segment 15, which is adapted to mesh with the toothed segment 7, whereby when the plug 11 is rotated in its valve-seat the segment 15, acting against segment 7, will turn the plug 5 in one direction or the other, according to the direction in which the plug member 11 is turned. In order to permit the insertion of the plug member 11 into position, I provide the wall of the valve-casing 1, near that part thereof surrounding the tapering valve-seat 16, with a bayonet-shaped slot 17, and in order to hold the members in the coupled position I provide a spring-catch 18, which is pivotally mounted in ears or lugs 19, carried by pipe-section 14, and engages with the lug 20, carried by the valve-casing 1. The catch 18 is held normally in engagement with the said lug 20 when the members are in the coupled position by means of the spring 21.

To couple the members together, the small end of the tapering plug 11 is inserted in its opening with the pipe-section 14 in line with the vertical leg of the bayonet-slot 17, the pipe-section 14 when in this position lying at right angles to the valve-casing. This will permit of the tapering plug 11 entering to its seat in the valve-casing, and as it is seated the toothed segment 15 engages the toothed segment 7. The tapering plug 11 is then turned so as to force the pipe-section 14 into the horizontal leg of the bayonet-shaped slot 17, thus causing the segment 15 to act against segment 7 and turn the plug-valve 5, whereby to bring port 12 into registry with port 3 and establishing communication from inlet-port 8 to the pipe-section 14. As the pipe-section 14 is forced into its seat in the horizontal leg of the bayonet-shaped slot the spring-pressed catch 18 engages with lug 20 to hold the members against accidental disengagement. To uncouple the members, the outer end of the spring-catch 18 is pressed toward the pipe-section 14, thus moving the inner end of said catch out of line with the plug 20, whereby the pipe-section 14 may be turned at right angles to permit the removal of the plug 11 from the valve-casing. This turning of the plug member 11 causes toothed segment 15 to act on toothed segment 7 and turn the plug-valve 5, whereby to move the port 6 out of registry with port 8 and port 3, thus shutting off the flow of fluid from the inlet. The ports 3, 6, and 12 are made of sufficient size, whereby an equal area of inlet-port 8 is provided in order not to retard the flowing of the fluid during its passage through the coupling.

It is to be noted that the act of coupling the two members opens the inlet and allows the fluid to pass to the outlet and that the act of uncoupling the two members operates the plug-valve 5, whereby to close the inlet and shut off the flow of fluid to the outlet.

It will further be noted that various changes may be made in the details of construction without departing from the general spirit of our invention.

Having fully described our invention, what we claim as new, and desire to secure by Letters Patent, is—

1. A hose-coupling embodying a male and a female member, the female member having a bayonet-shaped slot in the wall thereof and a central partition provided with a port and having a tapering valve-seat at each side of said central partition, a plug-valve fitted in one of said tapering valve-seats and provided with a toothed segment, a tapering plug adapted to fit in the other of the tapering valve-seats and having a toothed segment to engage with the segment of the plug-valve, a pipe-section carried by the tapering plug and adapted to lock in the bayonet-shaped slot in the female member, and means for locking the said sections in the coupled position, substantially as described.

2. In a hose-coupling, a male and a female member, the latter comprising a valve-casing having an inlet-port and provided with a central partition having a port therethrough, said valve-casing having a pair of tapering valve-seats, a plug-valve fitted in one of said valve-seats and provided with a transverse opening, a tapering plug adapted to fit in the other of said seats, a pipe-section carried by the said tapering plug and adapted to engage in a bayonet-shaped slot in the valve-casing, and means carried by the tapering plug for actuating the tapering valve as the plug is rotated in the valve-casing, substantially as described.

3. In a hose-coupling, a female member comprising a valve-casing and having a pair of tapering valve-openings with a central partition separating said openings and provided with a port, an inlet-port to said casing, a plug-valve fitted in one of the tapering openings, a tapering plug adapted to fit in the other of said openings, means for securing said plug in the locked position, and means carried by the plug and the tapering valve whereby the operating of the plug actuates the valve to open or close the inlet, substantially as described.

In testimony whereof we affix our signatures in the presence of two witnesses.

LEVI D. GOUGHENOUR.
    JULIUS A. MARX.

Witnesses:
 GEO. E. HARRIS,
 ANDREW A. SCHILLING.